United States Patent [19]

Everett et al.

[11] Patent Number: 4,823,846

[45] Date of Patent: Apr. 25, 1989

[54] TUBE PLUG TIP RESTRAINER APPARATUS

[75] Inventors: James W. Everett, Hempfield Township, Westmoreland County; Frank Sadofsky, Pittsburgh, both of Pa.

[73] Assignee: Westinghouse Electric Corp., Pittsburgh, Pa.

[21] Appl. No.: 137,622

[22] Filed: Dec. 24, 1987

[51] Int. Cl.⁴ ............................................. F16L 55/12
[52] U.S. Cl. ........................................ 138/89; 165/71; 376/204
[58] Field of Search ................. 138/89, 90, 97; 29/402.03, 426.1, 426.4, 426.5, 426.6, 726, 727, 758, 244, 251, 255, 283.5; 165/71, 76; 376/203, 45, 204

[56] References Cited

U.S. PATENT DOCUMENTS

| | | |
|---|---|---|
| 679,393 | 7/1901 | McPherson . |
| 779,388 | 1/1905 | Barnes . |
| 932,766 | 8/1909 | Daniels . |
| 1,050,557 | 1/1913 | McLaughlin . |
| 1,803,126 | 4/1931 | Oberhuber . |
| 2,315,538 | 4/1943 | Moeller . |
| 3,135,414 | 6/1964 | Lee II . |
| 4,091,841 | 5/1978 | Beneker et al. . |
| 4,262,187 | 4/1981 | Savor ................................. 138/89 |
| 4,310,029 | 1/1982 | Dudek . |
| 4,366,617 | 1/1983 | Nanstiel et al. . |
| 4,369,662 | 1/1983 | Rieben et al. . |
| 4,390,042 | 6/1983 | Kucherer et al. . |
| 4,393,564 | 7/1983 | Martin ................................. 138/89 |
| 4,502,511 | 3/1985 | Zafred . |
| 4,581,801 | 4/1986 | Kobuck et al. ................... 138/97 |
| 4,584,755 | 4/1986 | Lundquist ......................... 138/89 |
| 4,590,991 | 5/1986 | Cooper et al. .................... 138/89 |
| 4,637,436 | 1/1987 | Stewart, Jr. et al. . |
| 4,646,816 | 3/1987 | Rothstein ......................... 138/89 |

OTHER PUBLICATIONS

Co-pending patent application, Ser. No. 026,363 (W. E. Case 52,960), filing date Mar. 16, 1987, in the name of James W. Everett, entitled "Double Gimbal Camlock Installation Assembly", assigned to the Westinghouse Electric Corporation.
Co-pending Westinghouse Application Ser. No. 050,799 (W. E. Case 53,565) filed May 18, 1987 in the name of James W. Everett et al., entitled "Improved System and Method for Removing A Plug from A Heat Exchanger Tube", assigned to the Westinghouse Electric Corporation.
Co-pending Westinghouse Application Ser. No. 868,225 (W. E. Case 53,217) filed May 28, 1986 in the name of Keating et al. and entitled "Multi-Seal Mechanical Plug", assigned to the Westinghouse Electric Corporation.
Co-pending Westinghouse Application Ser. No. 868,226 (W. E. Case 53,176) filed May 28, 1986 in the name of Susanta Sinha et al. and entitled "Duplex Mechanical Tube Plug", assigned to the Westinghouse Electric Corporation.
Co-pending Westinghouse Application Ser. No. 936,558 (W. E. Case 53,457) filed Dec. 1, 1986, in the name of John J. Wilhelm, entitled "Plugging Apparatus and Method Using A Hydraulically Assisted Plug Expander", assigned to the Westinghouse Electric Corporation.
Co-pending Westinghouse Application Ser. No. 936,559 (W. E. Case 53,583) filed Dec. 1, 1986 in the name of John J. Wilhelm et al. entitled "Apparatus and Method for Plugging A Tube", assigned to the Westinghouse Electric Corporation.

*Primary Examiner*—James E. Bryant, III
*Attorney, Agent, or Firm*—Walter S. Stevens

[57] ABSTRACT

Apparatus for restraining the tip of a tube plug from traveling in a tubular member when the tip is fracturedly separated from the plug during the process of extracting the plug from the tubular member. The tube plug includes a shell defining an open cavity therein inwardly tapered from the tip of the plug. Slidably captured in the cavity is a shell expander which has a first bore therein, for expanding the shell into sealing engagement with the tubular member. The apparatus comprises an expansible restrainer, which is disposed in the first bore, for radially expanding the expander into engagement with the shell by radially expansibly engaging the first bore when axially compressed in the first bore. When the restrainer radially expansibly engages the first bore, the expander expansibly engages the shell for restraining the tip of the shell when the tip is fracturedly separated from the shell so that the tip does not travel in the tube and become lodged in or damage the tube.

24 Claims, 4 Drawing Sheets

TUBE PLUG TIP RESTRAINER APPARATUS

BACKGROUND OF THE INVENTION

This invention relates to apparatus for plugging tubular members and more specifically relates to a tube plug tip restrainer apparatus for restraining the tip of a tube plug from traveling in a tube when the tip is fracturedly separated from the plug during the process of extracting the plug from the tube.

It is well known that in a nuclear reactor a steam generator generates steam when heat is transferred by conduction through a heat conductor boundary separating a radioactive primary fluid from a secondary fluid, wherein the secondary fluid is water and wherein the radioactive primary fluid obtains a higher temperature than the secondary fluid. As the temperature of the secondary fluid increases, the secondary fluid reaches saturation temperature beyond which saturation temperature increasing fractions of the secondary fluid enter the vapor phase thereby producing steam. The steam generator typically includes a plurality of conduits or tubes therein through which the primary fluid flows. The walls of these tubes function as the heat conductor boundary for conducting heat from the primary fluid to the secondary fluid.

As indicated hereinabove, in a nuclear reactor the primary fluid flowing in the steam generator tubes is radioactive; hence, the steam generator is designed such that the radioactive primary fluid does not radioactively contaminate the secondary fluid by mingling with the secondary fluid. It is therefore desirable that the tubes remain leak-tight so that radioactive primary fluid remains everywhere separated from the secondary fluid to avoid mingling the radioactive primary fluid with the secondary fluid.

Occasionally, due to tube wall defects or tube wall cracking caused by stress and corrosion during operation, the steam generator tubes may develop surface and volume flaws and thus may not remain leak-tight. If through-wall cracking occurs due to the flaws, the radioactive primary fluid may mingle with the secondary fluid. Thus, corrective action may be necessary to ensure that the primary fluid does not mingle with the secondary fluid. Such corrective action may be to plug the tubes having flaws.

After the steam generator tube having the flaws has been plugged, it may be necessary to extract the plug. A tube plug may be extracted, for example, in order to repair the flawed tube or merely to replace a defective plug. One type of tube plug used in nuclear reactor steam generators is generally referred to in the art as a mechanical tube plug. The mechanical tube plug usually includes a tapered bore therein having an expander completely captured in the bore, which expander is used to expand the plug into engagement with the tube wall for sealingly plugging the tube when the expander is pulled downwardly towards the narrower portion of the tapered bore. If it is desired to extract the plug from the tube, the expander typically is pushed upwardly in the bore until the expander impacts the tip of the plug causing fracture and failure of the plug body and causing separation of the tip of the plug from the plug body. Separation of the tip of the plug from the plug body allows space for access of a tungsten inert gas (TIG) welding torch in the bore of the plug. The torch is used to make weld passes around a portion of the bore of the plug thereby shrinking and relaxing the plug by heating the plug to provide easier extraction from the tube. However, if the tip of the plug is unrestrained after separation, the tip may travel upwardly with relatively high velocity after separation from the plug body and may become lodged in or damage the tube. Thus, the tip of the plug and the expander should be restrained during the separation process so that the tip of the plug does not travel upwardly into the tube. Several designs of restrainers have been tried experimentally with limited success.

There are several devices known in the art for plugging tubular members. One such device is disclosed by U.S. Pat. No. 679,393 issued July 30, 1901 in the name of A. L. McPherson and entitled "Plug for Casings of Oil Wells". This patent discloses a plug for plugging the casings of oil wells. The plug, which when lowered to the bottom of the casing, will automatically clamp itself within the casing at the bottom thereof and will thus prevent sand from rising up in the casing through the open lower end of the casing. The plug includes external upwardly-pointing ratchet-teeth. If the plug is moved upwardly in the casing, the upwardly-pointing ratchet-teeth will engage the inner surface of the casing and oppose the upward movement of the plug. Although the McPherson patent may disclose a plug capable of engaging the casing such that the upward movement of the plug is opposed, it does not appear that the McPherson patent discloses a tube plug tip restrainer apparatus for restraining the tip of a tube plug when the tip is fracturedly separated from the plug body during the process of extracting the plug from a tubular member.

Another device for plugging tubular members is disclosed by U.S. Pat. No. 1,050,557 issued Jan. 14, 1913 in the name of H. L. McLaughlin and entitled "Plug for Oil and Gas Wells". The McLaughlin device includes a circular plug support around which is arranged an expansible plug, preferably made of rubber. The plug is suitably longitudinally compressed, thereby expanding so that the periphery of the plug will engage the inner walls of the casing or tubing. Although this patent may disclose an expansible plug capable of being longitudinally compressed, thereby expanding to engage the inner walls of a tube, this patent does not appear to disclose a tube plug tip restrainer as provided by the present invention for restraining the tip of a plug when the tip is fracturedly separated from the plug.

Yet another device for plugging a tube is disclosed by U.S. Pat. No. 4,310,029 issued Jan. 12, 1982 in the name of Matthew Dudek entitled "Expandable Tube Plug". The Dudek device comprises a first solid cylindrical rigid body member having a threaded bore extending axially inwardly from one end thereof; a bolt threadably received in the bore; a tubular sleeve of rubber or other compressible material slidably receiving the bolt and a second rigid body member of tubular configuration. The sleeve is positioned between the first and second body members. Upon the threading of the bolt into the first body member, the compressible sleeve is caused to expand radially outwardly into sealing engagement with the inner wall of a heat exchanger tube and radially inwardly into sealing engagement with the threads of the bolt. In order to remove the plug, the bolt is unscrewed from the cylindrical member sufficiently to relieve the compression of the expandable sleeve. However, the Dudek patent does not appear to disclose a tube plug tip restrainer as provided by the present invention for restraining the tip of a tube plug.

A tube plug having an elastomeric material on the outer surface thereof for enhancing the seal between the tube plug and a heat exchange tube is disclosed by U.S. Pat. No. 4,502,511 issued Mar. 5, 1985 in the name of Paolo R. Zafred entitled "Tube Plug" and assigned to the Westinghouse Electric Corporation. The Zafred device comprises a one-piece mechanical plug having one open end and one closed end, which plug is capable of being inserted in a heat exchange tube and internally expanded into contact with the inside surface of the heat exchange tube. The tube plug further comprises a groove extending around the outside circumference thereof which has an elastomeric material disposed in the groove for enhancing the seal between the tube plug and the tube. Although the Zafred patent may disclose a device, including elastomeric material, for plugging a steam generator tube, the Zafred patent does not appear to disclose the tube plug tip restrainer apparatus as described and claimed herein.

Consequently, while the prior art discloses devices for plugging tubes, the prior art does not appear to disclose a device for restraining the tip of a tube plug from traveling in a tube when the tip is fracturedly separated from the plug during the process of extracting the plug from the tube.

Therefore, what is needed is a tube plug tip restrainer apparatus for restraining the tip of a tube plug from traveling in a tube when the tip is fracturedly separated from the plug during the process of extracting the plug from the tube.

SUMMARY OF THE INVENTION

The tube plug tip restrainer apparatus of the present invention is an apparatus for restraining the tip of a tube plug from traveling in a tube when the tip is fracturedly separated from the plug during the process of extracting the plug from the tube. The tube plug includes a shell defining a tapered cavity therein for capturing a shell expander having a first bore therethrough, which shell expander is capable of expanding the shell when the expander is pulled towards the narrower portion of the tapered cavity. Pulling the expander towards the narrower portion of the tapered cavity radially expands the shell into sealing engagement with the tube, thus sealing the tube. The apparatus comprises an actuator rod having a flange thereon for abutting one end of the shell expander.

The apparatus further comprises a bearing member extending from one end of the actuator rod into the first bore of the shell expander. Coaxially mounted on the bearing member and disposed in the first bore of the shell expander is an expansible elastomeric restrainer member having a second bore therethrough. Coaxially mounted on the restrainer member is a compressor member for axially compressing the restrainer member against the bearing member. Threadably anchored in the bearing member is a connector shaft coaxially extending from the bearing member slidably through the second bore of the restrainer member, which connector shaft has a connector shaft head integrally connected to the terminal end thereof and slidably received in the compressor member.

Translating the actuator rod towards the plug tip also translates the expander member and restrainer member in direction of the plug tip because the actuator rod includes a bearing member thereon contacting the restraining member and also includes a flange thereon abutting one end of the shell expander. As the restrainer member moves toward the plug tip, the compressor member likewise moves towards the plug tip because the compressor member is mounted on the restrainer member. The compressor member moves toward the plug tip until the compressor member pushes against the plug tip. As the compressor member continues to push against the plug tip, the compressor member axially compresses the restrainer member against the bearing member so that the restrainer member radially expands into engagement with the first bore of the shell expander. The radial expansion of the restrainer member in turn causes the shell expander to radially expand into engagement with the plug. Further pushing of the compressor member against the plug tip causes the tip to fracture and separate at or near the location of engagement of the shell expander with the plug; however, due to the engagement, at that location, of the shell expander with the plug, the plug tip is precluded from traveling in the tube and its movement is therefore restrained.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT

The present invention provides a tube plug tip restrainer apparatus for restraining the tip of a plug from traveling in a tube when the tip is fracturedly separated from the plug during the process of extracting the plug from the tube so that the tip of the plug does not become lodged in or damage the tube.

Figure 1:
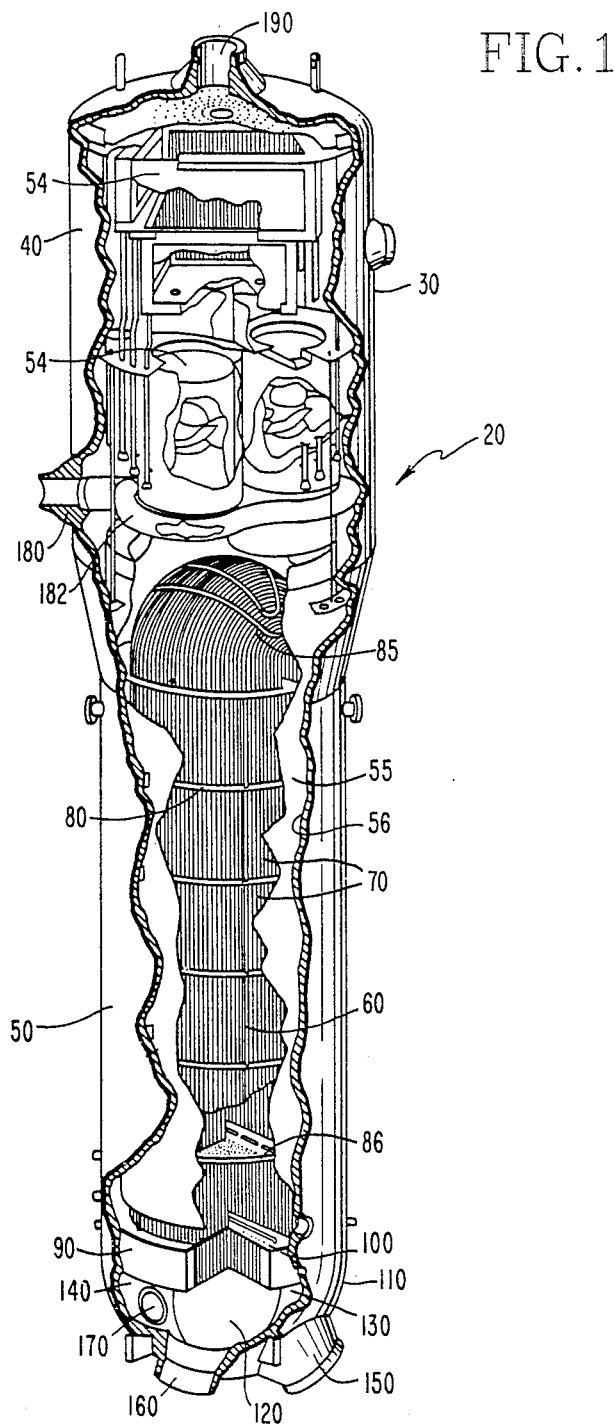
FIG. 1 is a view in perspective and partial vertical section of a steam generator with parts removed in the interest of clarity.

Referring to FIG. 1, a steam generator is referred to generally as 20 and comprises a generally cylindrical outer hull 30 having a cylindrical upper portion 40 and a cylindrical lower portion 50. Disposed in upper portion 40 is moisture separating means 54 for separating a steam-water mixture so that entrained water is removed from the steam-water mixture. Disposed in lower portion 50 is an inner hull 55 which is closed at its top end except for a plurality of openings disposed in its top end for allowing passage of the steam-water mixture from inner hull 55 to moisture separating means 54. Inner hull 55 is open at its bottom end, which inner hull 55 defines an annulus 56 between inner hull 55 and outer hull 30. Disposed in inner hull 55 is a vertical steam generator tube bundle 60 having a plurality of vertical, U-shaped steam generator tubes 70 therein, which may be mill annealed, thermally treated INCONEL 600. Disposed at various locations along the length of bundle 60 are a plurality of horizontal, circular tube support plates 80, which may be Type 405 stainless steel, having holes therein for receiving each tube 70, for laterally supporting tubes 70 and for reducing flow induced vibration in tubes 70. Additional support for tubes 70 is provided in the U-bend region of bundle 60 by a plurality of anti-vibration bars 85 which may be chrome-plated INCONEL.

Referring again to FIG. 1, disposed in lower portion 50 and below a bottom-most support plate 86 is a horizontal, circular tube sheet 90 having a plurality of vertical apertures 100 therethrough for receiving the ends of tubes 70, which ends of tubes 70 extend a predetermined distance through apertures 100. Tube sheet 90, which may be a nickel-molybdenum-chromium-vanadium allow clad in INCONEL, is sealingly attached, which may be by welding, around its circumferential edge to a hemispherical channel head 110. Disposed in channel head 110 is a vertical, semi-circular divider plate 120 sealingly attached, which may be by welding, to channel head 110 along the circumferential edge of divider plate 120 and sealingly attached, which may be by welding, to tube sheet 90 along the flat edge of divider plate 120. Divider plate 120 divides channel head 110 into an inlet plenum chamber 130 and an outlet plenum chamber 140.

Still referring to FIG. 1, disposed on outer hull 30 below tube sheet 90 are a first inlet nozzle 150 and a first outlet nozzle 160 in fluid communication with inlet plenum chamber 130 and with outlet plenum chamber 140, respectively. A plurality of manway holes 170 are disposed on outer hull 30 below tube sheet 90 for providing access to inlet plenum chamber 130 and outlet plenum chamber 140. Disposed on outer hull 30 above tube bundle 60 is a second inlet nozzle 180, which is connected to a perforated, horizontal and generally toroidal feedring 182 disposed in upper portion 40 for allowing entry of secondary fluid into upper portion 40 through inlet nozzle 180 and through the perforations (not shown) of feedring 182 which is in fluid communication with inlet nozzle 180. A second outlet nozzle 190 is disposed on the top of upper portion 40 for exit of steam from steam generator 20.

During operation of steam generator 20, primary fluid, which may be water and which may obtain a temperature of approximately 620 degrees Fahrenheit, enters inlet plenum chamber 130 through first inlet nozzle 150 and flows through tubes 70 to outlet plenum chamber 140 where the primary fluid exits steam generator 20 through first outlet nozzle 160. The secondary fluid, which is water, enters feedring 182 through second inlet nozzle 180, which is in fluid communication with feedring 182, and flows downwardly from the perforations (not shown) of feedring 182 through annulus 56 until the secondary fluid is in fluid communication with tube sheet 90. The secondary fluid then leaves annulus 56 flowing upwardly by natural convection through bundle 60 where the secondary fluid boils and vaporizes into a steam-water mixture due to conductive hear transfer from the primary fluid to the secondary fluid through the walls of tubes 70 which comprise bundle 60 and which function as heat conductors. The steam-water mixture flows upwardly from bundle 60 and is separated by moisture separating means 54 into saturated water and dry saturated steam which may obtain a minimum quality of approximately 99.75 percent. The saturated water flows downwardly from moisture separating means 54 and mixes with the secondary fluid flowing downwardly from feedring 182. Thus, as the secondary fluid enters feedring 182 through second inlet nozzle 180 dry saturated steam exits steam generator 20 through second outlet nozzle 190. In a manner well known in the art, the dry saturated steam is ultimately transported to a heat sink (not shown) after the dry saturated steam exits steam generator 20 through second outlet nozzle 190. Moreover, in a nuclear reactor the primary fluid is radioactive; therefore, steam generator 20 is designed such that the primary fluid is nowhere in direct fluid communication with the secondary fluid in order that the secondary fluid is not radioactively contaminated by mingling with the radioactive primary fluid.

Figure 2:
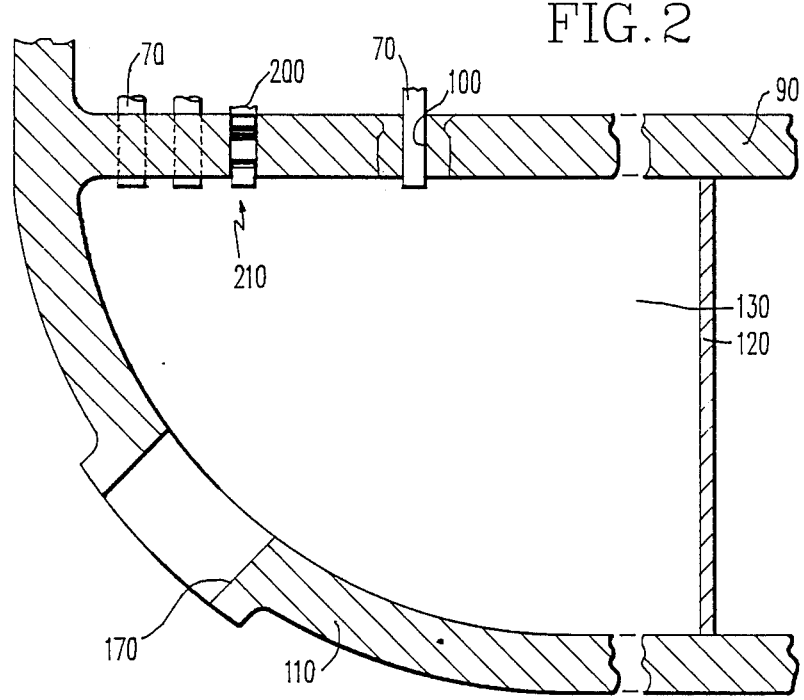
FIG. 2 illustrates a plenum chamber of the steam generator wherein a tube plug is installed in a steam generator tube for plugging the tube.

Referring to FIG. 2, there is illustrated a steam generator tube 200 possessing surface and/or volume flaws (not shown) in the wall thereof and having a tube plug generally referred to as 210 sealingly disposed therein for plugging tube 200 so that primary fluid from inlet plenum chamber 130 does not enter tube 200. As indicated hereinabove it is desirable that tubes 70 and thus tube 200 remain leak-tight so that radioactive primary fluid remains everywhere separated from the secondary fluid to avoid mingling the radioactive primary fluid with the secondary fluid. However, flawed tube 200 may not have remained leak-tight and therefore it has been sealingly plugged so that the primary fluid which would otherwise flow through tube 200 does not mingle with the secondary fluid surrounding tube 200. As described in more detail presently, tube plug 210 is configured so that tube plug 210 sealing engages the wall of tube 200 for sealing tube 200.

Figure 3:
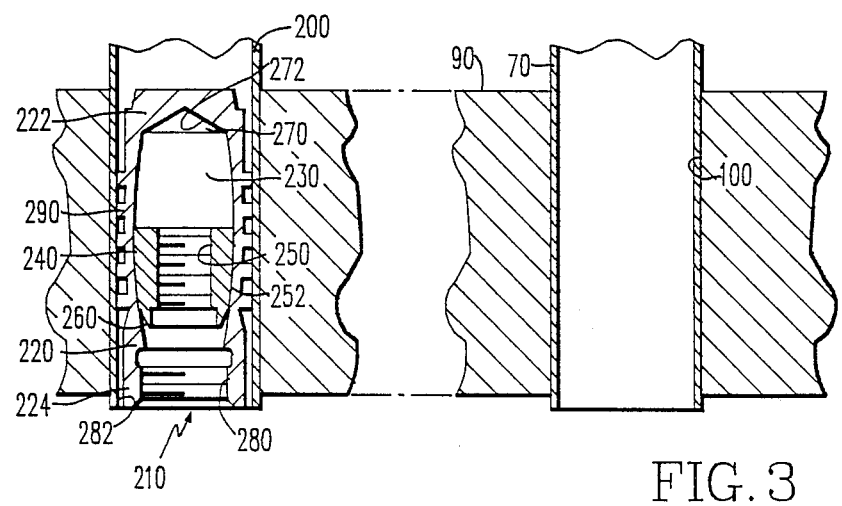
FIG. 3 is an illustration in vertical section of the tube plug disposed in the tube.

Referring to FIG. 3, tube plug 210 is sealingly disposed in tube 200 for sealing tube 200. Tube plug 210 comprises a generally cylindrical shell 220, which may be INCONEL 600, having a closed first end defining a tip 222 and having an open second end 224, which shell 220 defines an inwardly tapered cavity 230 therein for receiving a generally cylindrical shell expander 240. The smallest diameter of tapered cavity 230 is smaller than the largest diameter of shell expander 240 such that tapered cavity 230 completely captures shell expander 240. Shell expander 240, which may be CARPENTER STEEL 455, includes a step-wise first bore 250 therethrough, wherein first bore 250 is threaded in the smaller portion thereof for threadably engaging an externally threaded push rod (not shown) which is capable of axially translating shell expander 240 in tapered cavity 230. Shell expander 240 also includes a generally conical outer surface 252 terminating in a substantially rounded end 260, which rounded end 260 is nearer second end 224. Rounded end 260 minimizes pushing metal ahead of shell expander 240 when shell expander 240 is translated in tapered cavity 230 towards second end 224. Tapered cavity 230 tapers from near first end 220 to near second end 224 thus providing increasing mating engagement of conical outer surface 252 with the wall of tapered cavity 230 so that shell expander 240 exerts increasing internal radial pressure against shell 220 when shell expander 240 is translated by the push rod towards second end 224. Tapered cavity 230 may include a conical portion 270 having a conical ceiling 272 terminating near first end 220. Included in shell 220 nearest second end 224 is a threaded bore 280 in communication with tapered cavity 230, which threaded bore 280 is capable of threadably receiving a cylindrical, externally threaded extraction rod (not shown) for extracting tube plug 210 from tube 200 so that tube 200 is unplugged thereby. Tube plug 210 may be extracted from tube 200 by threadably engaging the extraction rod into threaded bore 280 and suitably exerting sufficient pulling force on the extraction rod so that tube plug 210 exits tube 200 through an open end 282 of tube 200.

Again referring to FIG. 3, tube plug 210 preferably includes a plurality of lands 290 circumferentially integrally formed on the external surface thereof for grippingly engaging the wall of tube 200. Lands 290 are distributed on the external surface of tube plug 210 in spaced-apart relation along the longitudinal axis thereof and extend from near first end 220 to near second end 224. Lands 290, which may have a generally rectangular transverse cross sectional configuration, are capable of sealingly engaging the wall of tube 200 so that tube plug 210 remains in tube 200 by such engagement for sealing tube 200 and so that primary fluid from inlet plenum chamber 130 or outlet plenum chamber 140 does not enter tube 200.

Figure 4:
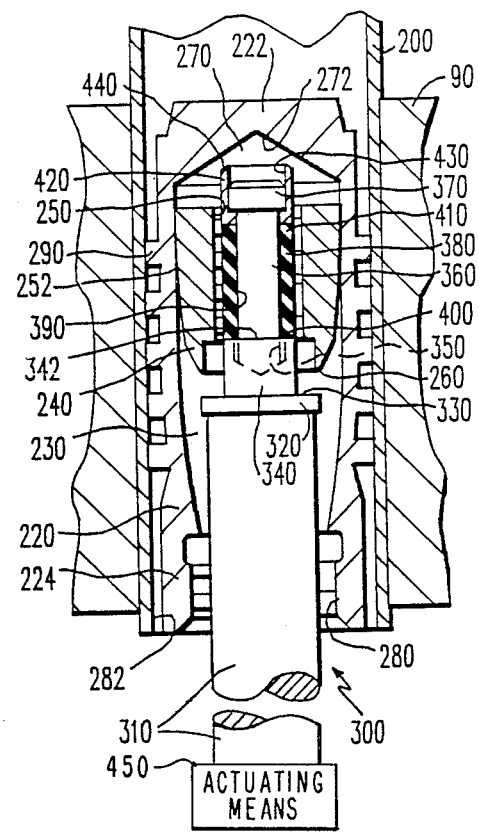
FIG. 4 is a view in partial vertical section of a tube plug tip restrainer apparatus installed in the tube plug.

Turning now to FIG. 4, there is illustrated the subject matter of the present invention, which is a tube plug tip restrainer apparatus generally referred to as 300 for restraining tip 222 of tube plug 210 from traveling in tube 200 when tip 222 is fracturedly separated from tube plug 210 during the process of extracting tube plug 210 from tube 200. Coaxially disposed through threaded bore 280 and into tapered cavity 230 is a generally cylindrical actuator rod 310 having a circumferential flange 320 integrally formed thereon. Flange 320 includes a flange surface 330 for abutting rounded end 260 of shell expander 240 so that flange surface 330 is capable of pushing shell expander 240. The smallest diameter of flange surface 330 is larger than the smallest diameter of rounded end 260 for pushing shell expander 240 in tapered cavity 230. Integrally attached to and extending from flange surface 330 into first bore 250 is a generally cylindrical bearing member 340 having a bearing surface 342 on the end thereof nearer tip 222 and having a coaxial, screw threaded recess 350 therein for threadably anchoring the threaded end of a generally cylindrical connector shaft 360. Connector shaft 360 extends from recess 350 a predetermined distance beyond bearing surface 342 and includes a generally cylindrical connector shaft head 370 integrally attached to the end thereof. Disposed in first bore 250 and coaxially mounted on bearing surface 342 is a generally cylindrical restrainer member 380 having a second bore 390 therethrough for slidably receiving connector shaft 360. As described in more detail hereinbelow, restrainer member 380, which may be an elastomeric material such as elastomeric rubber, is capable of radially expanding into engagement with second bore 390 and connector shaft 360 when restrainer member 380 is axially compressed against bearing surface 342. Restrainer member 380 has a first end 400 mounted on bearing surface 342 and a second end 410 nearer tip 222 of shell 220. Coaxially mounted on second end 410 is a generally cylindrical compressor member 420 having a step-wise bore 430 therethrough for slidably confining connector shaft head 370 in the larger portion of step-wise bore 430. Thus, connector shaft head 370 slidably connects compressor member 420 to restrainer member 380. As described in detail hereinafter, compressor member 420, which may be 17-4 PH steel, is capable of axially compressing restrainer member 380 against bearing surface 342 such that restrainer member 380 radially expands into engagement with first bore 250 of shell expander 240 for radially expansibly engaging shell expander 240 with shell 220. It will be appreciated that 17-4 PH steel is substantially comprised of approximately 17% chromium and approximately four percent nickel with the remaining constituents including iron and other elements and which steel is precipitation hardened for strength. Expansible engagement of shell expander 240 with shell 220 restrains tip 222 by force of friction from traveling in tube 200 and lodging in or damaging tube 200 when tip 222 fractures and separates from shell 220. Compressor member 420 may have a beveled edge 440 for matingly abutting conical ceiling 272 of conical portion 270 when compressor member 420 is translated towards conical portion 270 by actuator rod 310 which is attached to an actuating means (not shown) for translating actuator rod 310 in tapered cavity 230.

Figure 5:
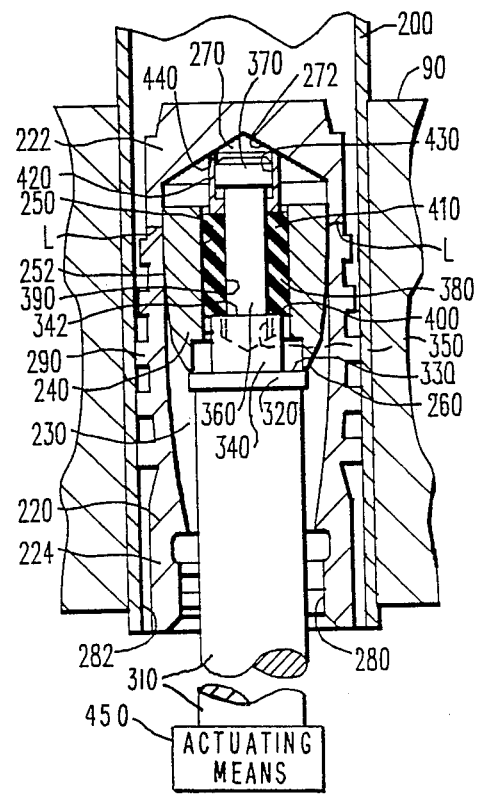
FIG. 5 is a view in partial vertical section of the restrainer apparatus fracturing and restraining the tip of the tube plug.

Referring to FIG. 5, shell expander 240 is shown being translated by actuator rod 310 towards conical portion 270. As the actuating means translates actuator rod 310 towards conical portion 270 shell expander 240 likewise translates towards conical portion 270 as flange surface 330 abuts and pushes rounded end 260. Moreover, as the actuating means translates actuator rod 310 towards conical portion 270, restrainer member 380 likewise translates towards conical portion 270 because first end 400 is mounted on bearing surface 342. It will be understood that as shell expander 240 translates towards conical portion 270 compressor member 420 likewise translates towards conical portion 270 because compressor member 420 is mounted on second end 410 of restrainer member 380. Compressor member 420 will continue to translate towards conical portion 270 as actuator rod 310 continues to translate towards conical portion 270 until beveled edge 440 matingly abuts ceiling 272 of conical portion 270 for exerting an axial force against ceiling 272 and tip 222. Continued translation of compressor member 420 will exert a continuing force by beveled edge 440 against ceiling 272 and tip 222 sufficient to circumferentially fracture shell 220 at or near location L.

Figure 6:
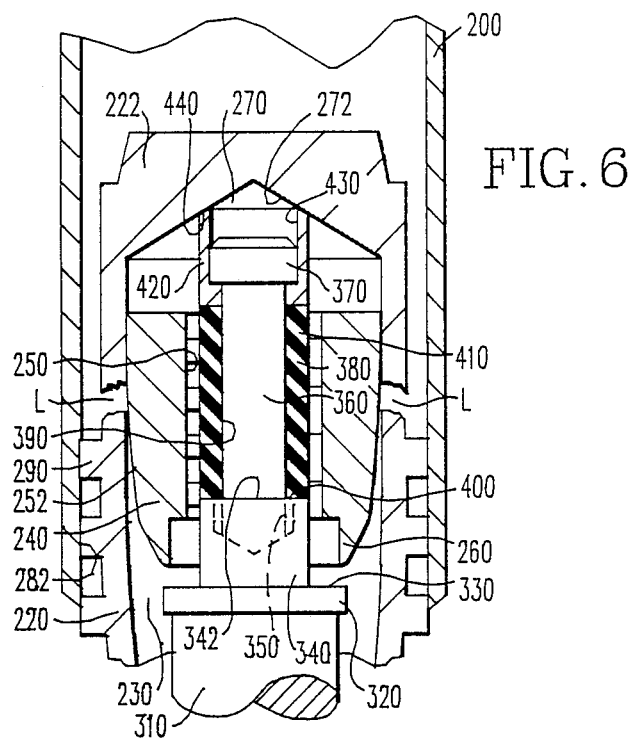
FIG. 6 shows the restrainer apparatus after the tip of the tube plug is fractured and separated from the tube plug.

As best seen in FIG. 6, tube plug tip restrainer apparatus 300 is illustrated disposed in tapered cavity 230 after tip 222 is fractured and separated from shell 220. As described hereinabove, compressor member 420 has exerted a continuing force against tip 222 sufficient to fracture shell 220 at or near location L. It will be understood that as force continued to act against tip 222, tip 222 circumferentially separated from shell 220 at or near location L due to the forcing action of compressor member 420 and/or shell expander 240 against tip 222.

Figure 7:
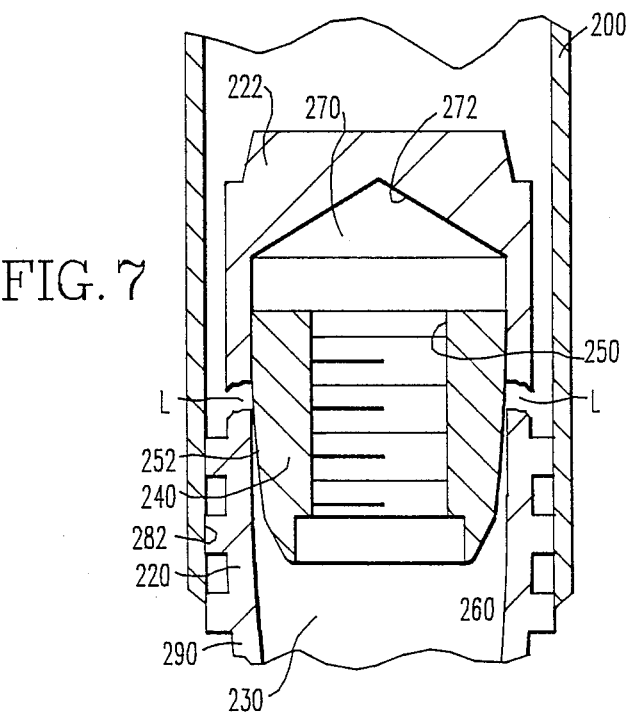
FIG. 7 illustrates the tube plug disposed in the tube after the plug tip is separated from the plug.

FIG. 7 illustrates tube plug 210 disposed in tube 200 after tip 222; is separated from shell 220 and after restrainer apparatus 300 is removed from tube plug 210.

In order to use tube plug tip restrainer apparatus 300, plug tip restrainer apparatus 300 is suitably inserted through threaded bore 280 and into tapered cavity 230 using actuator rod 310. As plug tip restrainer apparatus 300 is inserted through threaded bore 280 compressor member 420, connector shaft head 370, connector shaft 360, restrainer member 380 and bearing member 340 are urged into first bore 250 by actuator rod 310 which is connected to an actuating means 450 for translating actuator rod 310. Actuator rod 310 is thus translated by the actuating means 450 towards conical portion 270. As shown in FIG. 4, because flange surface 330 pushes rounded end 260 and because restrainer member 380 is mounted on bearing surface 342, shell expander 240 and restrainer member 380 translate towards conical portion 270 as actuator rod 310 translates towards conical portion 270. As illustrated in FIGS. 5 and 6, continued translation of actuator rod 310 causes beveled edge 440 to matingly abut ceiling 272 for exerting axial force against ceiling 272. The axial force exerted by beveled edge 440 may obtain a value of approximately three to ten thousand pounds. As beveled edge 440 continues to exert force against ceiling 272, the same axial force is thereby exerted against tip 222. It will be understood that as axial force is exerted against tip 222 in the manner described immediately above an equal and opposite axially compressive force is exerted against restrainer member 380 by compressor member 420 when beveled edge 440 abuts ceiling 272. Because restrainer member 380 is axially compressed between compressor member 420 and bearing surface 400, restrainer member 380 deforms and radially expands into engagement with connector shaft 360 and with first bore 250 of shell expander 240. It will be appreciated that the threads of first bore 250 are capable of gripping restrainer member 380 for holding restrainer member 380 in fixed axial relation with respect to shell expander 240 when restrainer member 380 engages first bore 250. The radial expansion of restrainer member 380 in first bore 250 exerts a radial expansive force on shell expander 240 such that outer surface 252 of shell expander 240 expands radially outwardly into further engagement with the interior wall of shell 220. As outer surface 252 further engages shell 220, actuator rod 310 continues to exert force on tip 222 in the manner described above until tip 222 fractures around the circumference of tip 222 at or near location L which is the locus of the fracture. Continued application of force by actuator rod 310 causes the fracture referred to above to propagate through the wall of shell 220 and causes tip 222 to separate from shell 220 at or near location L. However, due to the expansible engagement of shell expander 240 with shell 220 caused by the radial expansible engagement of restrainer member 380 with first bore 250, tip 222 is temporarily restrained by force of friction from traveling in tube 200 so that tip 222 will not become lodged in or damage tube 200. Of course, when tip 222 separates from shell 240 the axial force acting on ceiling 272 is relieved, thus relieving the axial compressive force on restrainer member 380. Relieving the compressive force on restrainer member 380 allows restrainer member 380 to return to its pre-deformed configuration (see FIG. 6) so that plug tip restrainer apparatus 300 can be withdrawn from first bore 250 and tapered cavity 230 by withdrawing actuator rod 310. After plug tip restrainer apparatus 300 is withdrawn from shell 220, shell 220 may be extracted from tube 200 in the manner described hereinabove in the Background f the Invention. In this regard, tip 222 falls downwardly through tube 200 by force of gravity as shell 220 is extracted from tube 200 until tip 222 and shell 220 exit tube 200 and are captured by a plug removal tool (not shown) positioned beneath tube 200.

Although the invention is illustrated and described herein in a preferred embodiment, it is not intended that the invention as illustrated and described be limited to the details shown, since various modifications may be obtained with respect to the invention without departing from the spirit of the invention or the scope of equivalents thereof.

Therefore, this invention provides a tube plug tip restrainer apparatus for restraining the tip of a tube plug from traveling in a tube when the tip is fracturedly separated from the plug during the process of extracting the plug from the tube.

What is claimed is:

1. A restrainer apparatus for restraining a tip of a plug when the tip is fracturedly separated from the plug, the plug capable of being disposed in a tubular member for plugging the tubular member, comprising:
   (a) a shell having a closed first end defining the tip and having an open second end, said shell defining an open cavity therein;
   (b) shell expander means disposed in the cavity for expanding said shell into engagement with the tubular member, said shell expander means having a first bore therethrough; and
   (c) restrainer means disposed in the first bore for expansibly engaging the first bore of said expander means enabling said expander means to expand into engagement with said shell as said expander means expansibly engages the first bore and restrain the tip of said shell by force of friction as the tip is fracturedly separated from said shell.

2. The apparatus according to claim 1, further comprising actuating means connected to said retainer means for expanding said restrainer means into engagement with said expander means, whereby said expander means expansibly engages said shell so that said shell expansibly engages the tubular member.

3. The apparatus according to claim 1, further comprising a plurality of lands circumferentially integrally attached to said shell for sealingly engaging the tubular member such that the tubular member is plugged thereby.

4. The apparatus according to claim 1, wherein said shell is generally cylindrical for plugging the tubular member.

5. The apparatus according to claim 1, wherein said expander means is generally cylindrical for expansibly engaging the cavity.

6. The apparatus according to claim 1, wherein said restrainer means is elastomeric.

7. The apparatus according to claim 6, wherein said restrainer member means is elastomeric rubber.

8. The apparatus according to claim 7, wherein said restrainer means is generally cylindrical for expansibly engaging the first bore.

9. A tube plug tip restrainer apparatus for temporarily restraining a tip of a tube plug when the tip is fracturedly separated from the plug, the plug capable of being disposed in a tube for plugging the tube, comprising:
   (a) a generally cylindrical shell having a closed first end defining the tip and having an open second end, said shell defining an open cavity therein inwardly tapered from the tip to the second end;
   (b) a generally cylindrical shell expander having a first bore therethrough and slidably disposed in the cavity for radially expanding said shell into engagement with the tube so that said shell expands as said shell expander slides in the cavity from the tip to the second end of said shell;

(c) a generally cylindrical restrainer member disposed in the first bore and having a first end nearer the second end of said shell and having a second end nearer to the tip of said shell for radially expanding said shell expander into engagement with said shell said restrainer member radially expansibly engaging the first bore as said shell expander expansibly engages said shell and, restraining the tip of said shell by force of friction as the tip is fracturedly separated from said shell; and (d) a plurality of spaced-apart lands circumferentially integrally attached to said shell for engaging the tube as said shell radially expands into engagement with the tube.

10. The apparatus according to claim 9, wherein said restrainer member is elastomeric.

11. The apparatus according to claim 10, wherein said restrainer member is elastomeric rubber.

12. The apparatus according to claim 9, wherein said shell expander has a generally rounded end nearer the second end of said shell for minimizing pushing metal ahead of said shell expander.

13. The apparatus according to claim 12, wherein said restrainer member has a bore therethrough.

14. The apparatus according to claim 9, further comprising a generally cylindrical compressor member having one end thereof coaxially mounted on the first end of said restrainer member for axially compressing said restrainer member in the first bore of said shell expander and having another end thereof nearer the tip of said shell for exerting an internal axial force against the tip of said shell.

15. The apparatus according to claim 14, further comprising a generally cylindrical actuator rod having one end thereof inserted into the cavity and having another end thereof engaging an actuating means for translating said actuator rod.

16. The apparatus according to claim 15, wherein said actuator rod further comprises a circumferential flange having a flange surface thereon for pushing said shell expander towards the tip.

17. The apparatus according to claim 16, wherein said actuator rod further comprises a generally cylindrical bearing member extending from the end thereof to the first end of said restrainer member.

18. The apparatus according to claim 17, wherein said bearing member has a bearing surface on one end thereof for compressing said restrainer member thereagainst.

19. The apparatus according to claim 18, wherein said actuator rod further comprises a cylindrical connector shaft extending from said bearing member through the first bore of said restrainer member to said compressor member.

20. The apparatus according to claim 19, wherein said connector shaft has one end thereof anchored in said bearing member and has the other end thereof slidably connected in said compressor member for slidably connecting said compressor member to said restrainer member.

21. The apparatus according to claim 9, wherein the first bore has threads capable of gripping said restrainer member.

22. The apparatus according to claim 21, wherein the first bore is a step bore having one diameter smaller than the other diameter.

23. The apparatus according to claim 22, wherein said threads are formed in the smaller diameter of the step bore.

24. The apparatus according to claim 9, wherein the largest diameter of said shell expander is larger than the smallest diameter of said shell.

* * * * *